United States Patent Office 3,158,631
Patented Nov. 24, 1964

3,158,631
Δ²,⁴-PREGNADIENE DERIVATIVES
Albert Bowers and James C. Orr, Mexico City, Mexico, assignors, by mesne assignments, to Syntex Corporation, a corporation of Panama
No Drawing. Filed Feb. 21, 1962, Ser. No. 174,679
14 Claims. (Cl. 260—397.3)

The present invention relates to novel cyclopentanophenanthrene derivatives and to a process for the production thereof.

More particularly the present invention relates to novel derivatives of 2-methyl-Δ²,⁴-pregnadien-20-one.

The novel compounds of the present invention are represented by the following formulas:

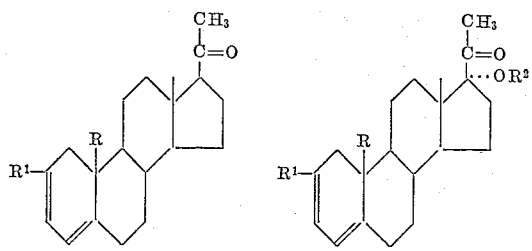

In the above formulas R and R¹ represents hydrogen or methyl and R² represents hydrogen or an acyl group derived from a hydrocarbon carboxylic acid of less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthenate, benzoate, trimethylacetate, t-butylacetate, phenoxyacetate, cyclopentylpropionate, aminoacetate and β-chloropropionate.

The compounds represented by the above formulas are powerful progestational agents. They also exhibit anti-estrogenic, anti-gonadotrophic and anti-androgenic activities. They are useful in fertility control, in the treatment of premenstrual tension and lower the cholesterol level in blood serum and adrenal gland. In addition they are diuretic and anti-aldosterone agents.

The 2α-methyl-17α-substituted compounds of the present invention are prepared by the process illustrated by the following equation:

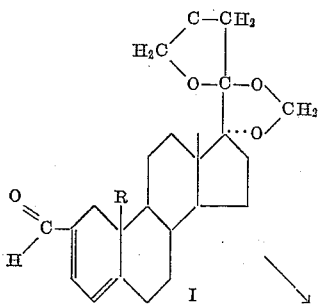

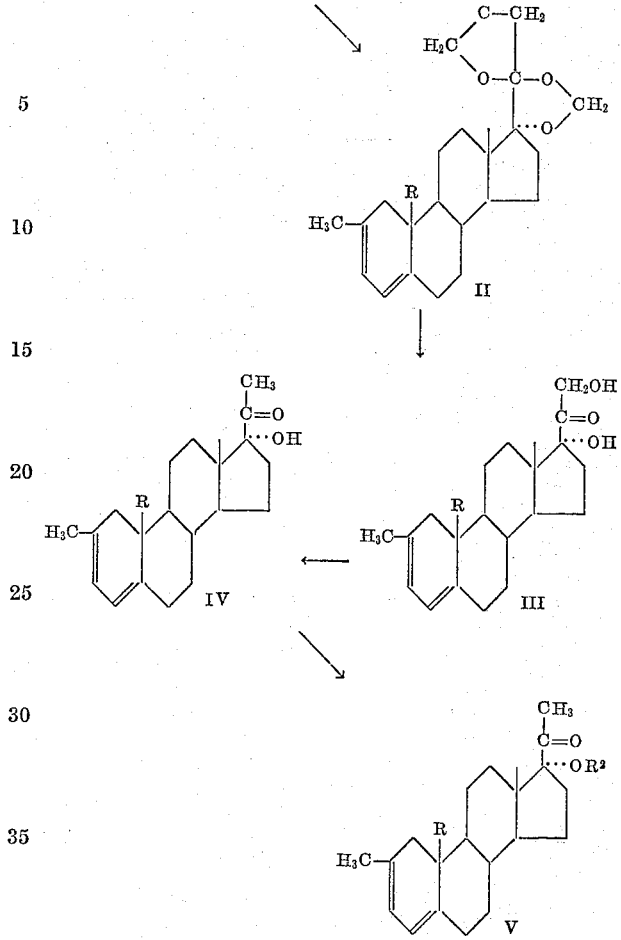

In the above formulas R and R² have the same meaning as hereinabove set forth.

In practicing the process outlined above the starting compound 2 - formyl-17,20;20,21-bismethylenedioxy-Δ²,⁴-pregnadiene or the 19-nor derivative (I) (obtained in accordance with our copending U.S. patent application 133,069 filed August 22, 1961 now U.S. Patent No. 3,053,862) is treated with ethanedithiol in the presence of an acid such as a saturated solution of hydrogen chloride in acetic acid, affording the corresponding dithioacetal derivative. Treatment of this compound with Raney nickel in a suitable solvent, preferably acetone, at reflux temperature for a period of time of the order of 6 hours, furnishes the corresponding 2-methyl-17,20;20,21-bismethylenedioxy-Δ²,⁴-pregnadiene derivative (II). This compound upon treatment with an acid such as 60% formic acid, furnishes the respective 2-methyl-Δ² ⁴-pregnadiene-17α,21-diol - 20 - one derivative (III). The 21-hydroxyl group of this compound is eliminated by treatment with tosyl chloride in pyridine and subsequent reaction of the resultant 21-tosylate with sodium iodide in a suitable solvent, preferably acetic acid, at reflux temperature. The obtained 2-methyl-Δ²,⁴-pregnadiene-17α-ol-20-one compound (IV) is conventionally acylated in the presence of p-toluenesulfonic acid with an excess of an acylating agent, as for example, acetic anhydride or propionic anhydride, thus affording the corresponding 17α-acyloxy derivative (V: R²=acyl).

The 2-methyl compounds of the present invention lacking the C-17α substituent are prepared by the process exemplified by the following equation:

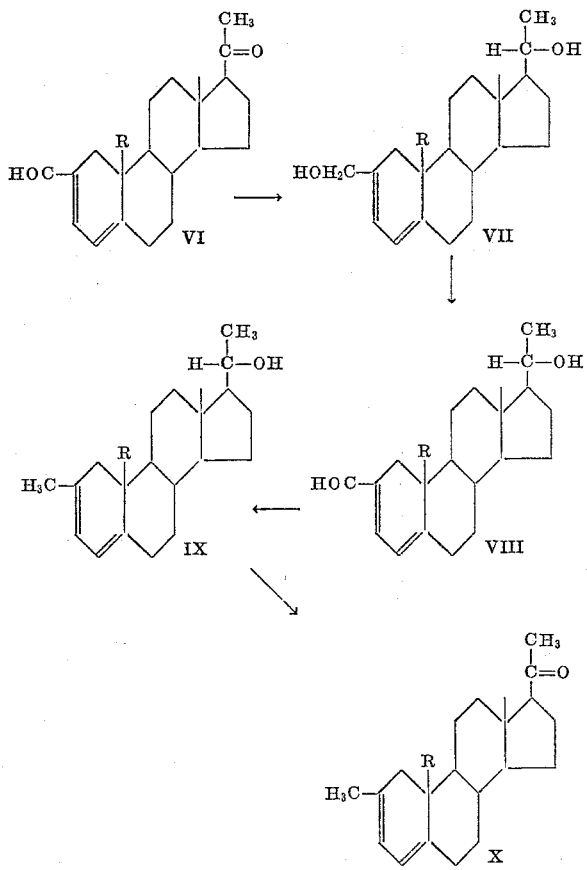

In the above formulas R has the same meaning as heretofore set forth.

In practicing the process just outlined the starting compounds 2-formyl-Δ²,⁴-pregnadiene-20-one or the corresponding 19-nor compound (VI) (obtained in accordance with our copending U.S. patent applicattion 133,068 filed August 22, 1961 now U.S. Patent No. 3,053,859) is reduced preferably with sodium borohydride, thus furnishing the respective 2-hydroxymethyl-Δ²,⁴-pregnadiene- 20β-ol compound (VII). The 2-hydroxymethyl group, which contains an allylic hydroxyl, is selectively oxidized with a suitable reagent such as 2,3-dichloro-5,6-dicyano-1,4-benzoquinone in a solvent inert to the last named reagent, as for example dioxane, thus affording the corresponding 2-formyl-Δ²,⁴-pregnadiene-20β-ol derivative (VIII).

The 2-formyl group of this last compound is reduced to the 2-methyl group (IX) by treatment with ethane-dithiol in the presence of an acid such as a saturated solution of hydrogen chloride in acetic acid, and subsequent reaction of the formed dithioacetal with Raney nickel in a suitable solvent, preferably acetone, at reflux temperature for a period of time of the order of 6 hours.

Treatment of the obtained compound (IX) with a suitable oxidizing agent such as chromium trioxide in pyridine furnishes the corresponding 2-methyl-Δ²,⁴-pregnadiene-20-one derivative (X).

The novel compounds of the present invention unsubstituted at C-2 are obtained by a method illustrated by the following equation:

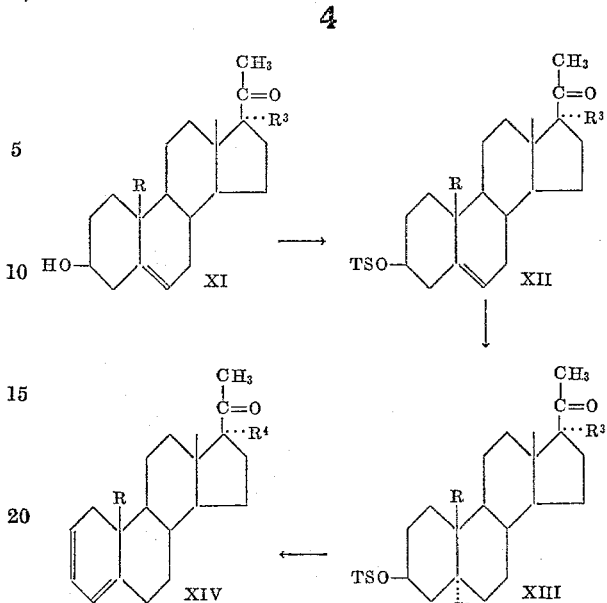

In the above formulas R has the same meaning as previously set forth; R³ represents hydrogen or hydroxy and R⁴ represents hydrogen, hydroxy or acyloxy in which the acyloxy group is derived from hydrocarbon carboxylic acids of the type described hereinabove.

In practicing the process set forth above Δ⁵-pregnen-3β-ol-20-one, Δ⁵-pregnene-3β,17α-diol-20-one or the corresponding 19-nor-compounds (XI) is converted into the corresponding 3-tosylate (XII) by reaction with tosyl chloride in pyridine solution. The above compound is then chlorinated at C-5 by treatment with dry hydrogen chloride. The reaction is preferably conducted at low temperature, dissolving the steroid in a mixture of chloroform-ethanol and passing to this solution a stream of dry hydrogen chloride until saturation. The resulting mixture is then allowed to stand at 0° C. for a period of time in the order of 5 days. The resulting 3-tosylate 5α-chloro pregnan derivative (XIII) is then refluxed with lithium carbonate in dimethyl formamide, for a period of time in the order of 30 minutes thus producing Δ²,⁴-pregnadien-20-one; Δ²,⁴-pregnadien-17α-ol-20-one as well as the corresponding 19-nor derivatives (XIV: R⁴=H or OH). Upon esterification of the 17α-hydroxy compounds with acid anhydrides of less than 12 carbon atoms in benzene solution and in the presence of p-toluenesulfonic acid there are produced the corresponding esters (XIV: R⁴=acyloxy).

The present application is a continuation-in-part of our copending patent application Serial No. 133,070, filed on August 22, 1961, now abandoned.

The following specific examples serve to illustrate but are not intended to limit the scope of the invention:

PREPARATION 1

A solution of 5 g. of sodium borohydride in 13 cc. of water was added to an ice-cooled solution of 5 g. of 19-nor-progesterone in 500 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 19-nor-Δ⁴-pregnene-3β, 20β-diol and 19-nor-Δ⁴-pregnene-3α,20β-diol.

A mixture of 4.5 g. of the latter mixture of compounds in 100 cc. of dioxane, and 1.1 molar equivalents of 2,3-dichloro-5,6-dicyano-1,4-benzoquinone was kept at room temperature for 3 hours. The hydroquinone formed during the reaction was filtered off, and the filtrate evaporated to dryness. The residue was dissolved in acetone and filtered through 100 g. of alumina. Crystallization from acetone-hexane gave 19-nor-Δ⁴-pregnen-20β-ol-3-one.

A solution of 4 g. of the foregoing steroid in 50 cc. of acetic anhydride and 50 cc. of acetyl chloride was boiled for 4 hours under an atmosphere of nitrogen. The reaction mixture was then distilled almost to dryness, cooled, diluted with ether and the organic extract washed with water, then with 5% sodium bicarbonate solution and finally with water. There was thus obtained 3,20β-diacetoxy-19-nor-Δ³,⁵-pregnadiene.

A solution of 3 g. of sodium borohydride in 9 cc. of water was added to an ice-cooled solution of 3 g. of the above compound in 360 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 19-nor-Δ⁵-pregnene-3β,20β-diol-20-acetate.

5 cc. of dihydropyrane were added to a solution of 2 g. of the foregoing compound in 40 cc. of benzene and about 2 cc. was distilled to remove moisture. 1 g. of p-toluenesulfonic acid was added to the cooled solution, which was then allowed to stand at room temperature for 4 days. The solution was washed with sodium carbonate and water, dried and evaporated. The residue was chromatographed on 45 g. of neutral alumina. Crystallization of the fractions eluted with hexane from pentane yielded the 3-tetrahydropyranyl ether-19-nor-Δ⁵-pregnene-3β,20β-diol-20-acetate.

A suspension of 2.5 g. of the above ether in 160 cc. of methanol was treated with a solution of 2 g. of potassium carbonate in 16 cc. of water; the mixture was boiled under reflux for 1 hour and then cooled in ice and diluted with water. The formed precipitate was collected and recrystallized from acetone-hexane to yield the 3-tetrahydropyranyl ether of 19-nor-Δ⁵-pregnene-3β,20β-diol.

A solution of 2 g. of the foregoing compound in 40 cc. of pyridine was added to a mixture of 2 g. of chromic trioxide in 40 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded the 3-tetrahydropyranyl ether of 19-nor-Δ⁵-pregnen-3β-ol-20-one.

To a solution of 1 g. of the foregoing tetrahydropyranyl ether in 30 cc. of acetic acid was added 0.5 cc. of 2 N hydrochloric acid. After 5 hours at room temperature, water was added and the product extracted with methylene chloride. The extract was washed to neutral, dried over anhydrous sodium sulfate and evaporated to dryness. Crystallization from acetone-hexane yielded 19-nor-Δ⁵-pregnen-3β-ol-20-one.

PREPARATION 2

A mixture of 6.6 g. of 19-nor-Δ⁵-pregnen-3β-ol-20-one, 2.7 g. of p-toluenesulfonic acid and 300 cc. of acetic anhydride was submitted to a slow distillation during 5 hours. The residue was cooled and poured into iced water. The product was then extracted with ether, the extract washed successively with an aqueous solution of sodium carbonate and water to neutral, dried and evaporated to dryness. The residue consisted of 3β,20-diacetoxy-19-nor-Δ⁵,¹⁷⁽²⁰⁾-pregnadiene, which was utilized in the following step without purification.

6 g. of this crude diacetoxy compound were treated with 480 cc. of a 1.2 molar solution of perbenzoic acid in benzene (2.2 molar equivalents), at room temperature and in the dark, for 20 hours. Water was then added, the organic layer separated, washed with an aqueous solution of sodium bicarbonate, then with water, dried with anhydrous sodium sulfate and evaporated to dryness. The residue consisted of the crude 3β,20β-diacetoxy-5α,6α; 17α,20α-bisoxido-19-nor-pregnane.

This crude oxide compound was treated with 500 cc. of a 1% methanolic solution of potassium hydroxide at room temperature for 1 hour, the mixture was neutralized by addition of acetic acid, concentrated to small volume under reduced pressure, the product was precipitated by addition of ice water, filtered off, washed with water, dried and recrystallized from acetone-methanol, thus yielding 5α,6α-oxido-19-nor-pregnane-3β,17α-diol-20-one.

To 5 g. of the foregoing oxide in 80 cc. of glacial acetic acid, there was added a mixture of 6 g. of sodium iodide, 1.6 g. of sodium acetate, 320 mg. of zinc and 2 drops of water. While cooling in an ice bath and stirring, there were added to the resulting mixture, 800 mg. of zinc dust in small portions. The stirring was continued for 6 hours and the temperature allowed to attain 25° C.

The reaction mixture was filtered and the filtrate diluted with ice water, alkalized with sodium bicarbonate and extracted with ethyl acetate. The extract was washed to neutral, dried over anhydrous sodium sulfate and evaporated to dryness. Crystallization from acetone-hexane yielded 19-nor-Δ⁵-pregnene-3β,17α-diol-20-one.

*Example I*

A solution of 5 g. of 2-formyl-17,20;20,21-bismethylenedioxy-Δ²,⁴-pregnadiene in 100 cc. of glacial acetic acid containing 5 cc. of ethanedithiol and 4 cc. of a saturated solution of hydrogen chloride in acetic acid was allowed to stand at room temperature for 4 hours. Water was added and the resulting mixture was extracted with ethyl acetate. The extract was washed with a 5% aqueous sodium bicarbonate solution, water, dried over sodium sulfate and evaporated to dryness. Recrystallization from ether-hexane afforded the cycloethylene dithioacetal of the 2-formyl-17,20;20,21-bismethylenedioxy-Δ²,⁴-pregnadiene.

A solution of 4 g. of the foregoing compound dissolved in 3 lt. of acetone was boiled under reflux for 6 hours with 50 g. of Raney nickel. The metal was removed by filtration and washed well with hot acetone. The filtrate was evaporated to dryness, dissolved in chloroform and washed with dilute hydrochloric acid, sodium carbonate solution and water. Drying, evaporation and crystallization of the residue from acetone-hexane furnished 2-methyl-17,20;20,21-bismethylenedioxy-Δ²,⁴-pregnadiene.

Following the above technique was treated 2-formyl-17,20;20,21-bismethylenedioxy-19-nor-Δ²,⁴ pregnadiene and there was afforded 2-methyl-17,20;20,21-bismethylenedioxy-19-nor-Δ²,⁴-pregnadiene.

*Example II*

1 g. of 2-methyl-17,20;20,21-bismethylenedioxy-Δ²,⁴-pregnadiene was heated on the steam bath with 20 cc. of 60% formic acid for 20 minutes, cooled, diluted with water and the precipitate was collected, washed with water, dried and recrystallized from acetone-hexane, thus affording 2-methyl-Δ²,⁴-pregnadiene-17α,21-diol-20-one.

When applying this technique to 2-methyl-17,20;20,21-bismethylenedioxy-19-nor-Δ²,⁴-pregnadiene, there was obtained 2-methyl-19-nor-Δ²,⁴-pregnadiene-17α,21-diol-20-one.

*Example III*

A solution of 5 g. of 2-methyl-Δ²,⁴-pregnadiene-17α,21-diol-20-one in 25 cc. of pyridine was cooled to 0° C. Under stirring there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude 21-tosylate of the starting material.

A solution of 2.5 g. of the above crude compound in 100 cc. of glacial acetic acid was treated with 7 g. of sodium iodide and the mixture was refluxed for 2 hours, poured into ice water and extracted several times with methylene chloride; the extracts were combined, washed successively with aqueous sodium carbonate solution, sodium sulfite solution and water and then evaporated. By crystallization of the residue from acetone-hexane there was obtained 2-methyl-$\Delta^{2,4}$-pregnadiene-17α-ol-20-one.

Treating 2-methyl-19-nor-$\Delta^{2,4}$-pregnadiene-17α,21-diol-20-one by the above procedure, there was obtained 2-methyl-19-nor-$\Delta^{2,4}$-pregnadiene-17α-ol-20-one.

*Example IV*

A solution of 1 g. of sodium borohydride in 3 cc. of water was added to an ice-cooled solution of 1 g. of 2-formyl-$\Delta^{2,4}$-pregnadiene-20-one in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 2-hydroxymethyl-$\Delta^{2,4}$-pregnadiene-20β-ol.

By the same procedure was treated 2-formyl-19-nor-$\Delta^{2,4}$-pregnadiene-20-one, thus affording 2-hydroxymethyl-19-nor-$\Delta^{2,4}$-pregnadiene-20-one.

*Example V*

A mixture of 1 g. of 2-hydroxymethyl-$\Delta^{2,4}$-pregnadiene-20β-ol in 20 cc. of dioxane, and 1.1 molar equivalents of 2,3-dichloro-5,6-dicyano-1,4-benzoquinone was kept at room temperature for 3 hours. The hydroquinone formed during the reaction was filtered off, and the filtrate evaporated to dryness. The residue was dissolved in acetone and filtered through 20 g. of alumina. Crystallization from acetone-hexane gave 2-formyl-$\Delta^{2,4}$-pregnadiene-20β-ol.

When applying the above procedure to 2-hydroxymethyl-19-nor-$\Delta^{2,4}$-20β-ol, there was obtained 2-formyl-19-nor-$\Delta^{2,4}$-pregnadiene-20β-ol.

*Example VI*

2-formyl-$\Delta^{2,4}$-pregnadiene-20β-ol and 2-formyl-19-nor-$\Delta^{2,4}$-pregnadiene-20β-ol were treated according to the procedure described in Example I, furnishing respectively 2-methyl-$\Delta^{2,4}$-pregnadiene-20β-ol and 2-methyl-19-nor-$\Delta^{2,4}$-pregnadiene-20β-ol.

*Example VII*

A solution of 1 g. of 2-methyl-$\Delta^{2,4}$-pregnadiene-20β-ol in 20 cc. of pyridine was added to a mixture of 1 g. of chromic trioxide in 20 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 2-methyl-$\Delta^{2,4}$-pregnadiene-20-one.

2-methyl-19-nor-$\Delta^{2,4}$-pregnadiene-20β-ol was treated following the above procedure, furnishing 2-methyl-19-nor-$\Delta^{2,4}$-pregnadiene-20-one.

*Example VIII*

A mixture of 1 g. of 2-methyl-$\Delta^{2,4}$-pregnadiene-17α-ol-20-one, 1 g. of p-toluenesulfonic acid monohydrate, 50 cc. of acetic acid and 25 cc. of acetic anhydride was kept for 24 hours at room temperature. It was then poured into water and stirred until the excess of anhydride had hydrolyzed. Isolation of the product by methylene chloride extraction and crystallization of the residue from acetone-ether gave the 17-acetate of 2-methyl-$\Delta^{2,4}$-pregnadiene-17α-ol-20-one.

Following the same procedure was treated 2-methyl-19-nor-$\Delta^{2,4}$-pregnadiene-17α-ol-20-one, thus affording the 17-acetate of 2-methyl-19-nor-$\Delta^{2,4}$-pregnadiene-17α-ol-20-one.

*Example IX*

2-methyl-$\Delta^{2,4}$-pregnadiene-17α-ol-20-one and 2-methyl-19-nor-$\Delta^{2,4}$-pregnadiene-17α-ol-20-one were treated following the procedure described in Example VIII except that acetic anhydride was substituted by propionic anhydride, caproic anhydride and cyclopentylpropionic anhydride, thus furnishing the corresponding 17-propionates, 17-caproates and 17-cyclopentylpropionates.

*Example X*

A mixture of 10 g. of $\Delta^5$-pregnen-3β-ol-20-one, 40 cc. of pyridine and 5 g. of tosyl chloride was kept overnight at 0° C. It was then diluted with water and the formed precipitate collected by filtration, thus producing the tosylate of $\Delta^5$-pregnen-3β-ol-20-one.

A solution of 10 g. of the crude tosylate is 320 cc. of chloroform and 80 cc. of anhydrous ethanol was saturated with dry hydrogen chloride. The reaction mixture was kept at 0° C. for 5 days. and diluted with water. The organic layer was separated, washed with sodium carbonate solution and water to neutral, dried over anhydrous sodium sulfate and evaporated to dryness. Recrystallization of the residue from acetone-ether gave 5α-chloro-pregnan-3β-ol-20-one tosylate.

A solution of 2 g. of the above compound in 40 cc. of cold dimethylformamide was added over 15 minutes to a suspension of 5 g. of finely divided lithium carbonate in 15 cc. of refluxing dimethylformamide. The mixture was refluxed for 30 minutes further, cooled and filtered. The filtrate was diluted with water and extracted with ethyl acetate. The extract was washed with dilute hydrochloric acid, water, aqueous sodium bicarbonate solution and water, then dried over anhydrous sodium sulfate and evaporated to dryness. Silica gel chromatography and recrystallization from acetone-hexane afforded $\Delta^{2,4}$-pregnadien-20-one.

In a similar manner, 19-nor-$\Delta^5$-pregnen-3β-ol-20-one was converted into $\Delta^{2,4}$-19-nor-pregnadien-20-one.

*Example XI*

By following the method described in the preceding example 5 g. of $\Delta^5$-pregnene-3β,17α-diol-20-one were treated with tosyl chloride in pyridine solution to give $\Delta^5$-pregnene-3β,17α-diol-20-one 3-tosylate. Upon chlorination of this compound at C–5 followed by treatment with lithium carbonate in dimethylformamide there was produced $\Delta^{2,4}$-pregnadien-17α-ol-20-one.

1 g. of the above compound was dissolved in 20 cc. of benzene and treated with 2 cc. of propionic anhydride and 200 mg. of p-toluenesulfonic acid. The mixture was kept overnight at room temperature, then diluted with water and stirred for 30 minutes to hydrolyze the excess of reagent; the benzene layer was separated and washed with 5% sodium carbonate solution and finally with water to neutral, dried over anhydrous sodium sulfate and evaporated to dryness under vacuum. Crystallization of the residue from acetone-ether gave $\Delta^{2,4}$-pregnadien-17α-ol-20-one propionate.

By the same method but using acetic, caproic, and cyclopentylpropionic anhydrides as esterifying agents there were obtained the acetate, the caproate and the cyclopentylpropionate of $\Delta^{2,4}$-pregnadien-17α-ol-20-one.

*Example XII*

In accordance with the method described in Example X, 19-nor-$\Delta^5$-pregnene-3β,17α-diol-20-one was converted into 19-nor-$\Delta^{2,4}$-pregnadien-17α-ol-20-one. Upon esterification of the latter compound with acetic anhydride-acetic acid, by following the method of Example VIII, there was produced the acetate of 19-nor-$\Delta^{2,4}$-pregnadien-17α-ol-20-one.

We claim:
1. A compound of the following formula:

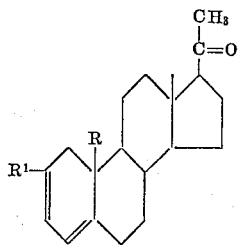

wherein R and $R^1$ are selected from the group consisting of hydrogen and methyl.

2. 2-methyl-$\Delta^{2,4}$-pregnadien-20-one.
3. 2-methyl-19-nor-$\Delta^{2,4}$-pregnadien-20-one.
4. $\Delta^{2,4}$-pregnadien-20-one.
5. 19-nor-$\Delta^{2,4}$-pregnadien-20-one.
6. A compound of the following formula:

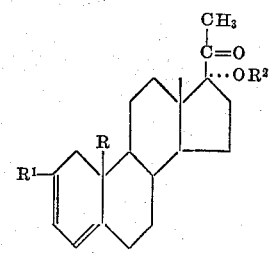

wherein R and $R^1$ are selected from the group consisting of hydrogen and methyl and $R^2$ is selected from the group consisting of hydrogen and a hydrocarbon carboxylic acyl group of less than 12 carbon atoms.

7. 2-methyl-$\Delta^{2,4}$-pregnadien-17α-ol-20-one.
8. 2-methyl-19-nor-$\Delta^{2,4}$-pregnadien-17α-ol-20-one.
9. 2-methyl-$\Delta^{2,4}$-pregnadien-17α-ol-20-one-acetate.
10. 2-methyl - 19-nor-$\Delta^{2,4}$-pregnadien - 17α - ol-20-one-acetate.
11. $\Delta^{2,4}$-pregnadien-17α-ol-20-one.
12. 19-nor-$\Delta^{2,4}$-pregnadien-17α-ol-20-one.
13. $\Delta^{2,4}$-pregnadien-17α-ol-20-one propionate.
14. 19-nor-$\Delta^{2,4}$-pregnadien-17α-ol-20-one acetate.

No references cited.